No. 674,216. Patented May 14, 1901.
T. J. PETERS.
RAKE.
(Application filed Nov. 1, 1900.)
(No Model.)
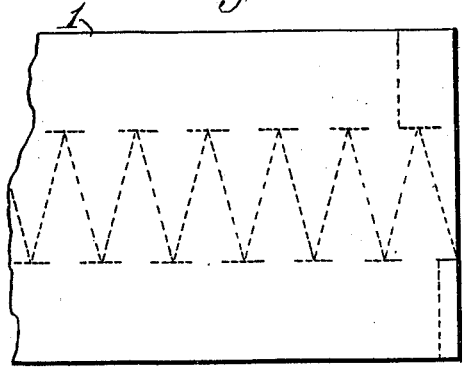
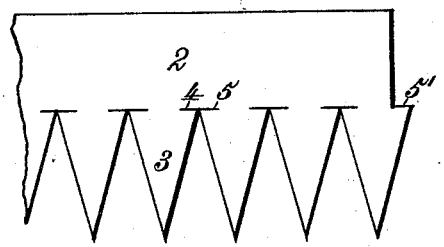
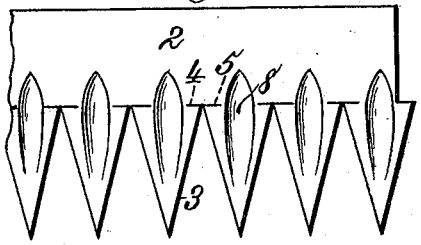
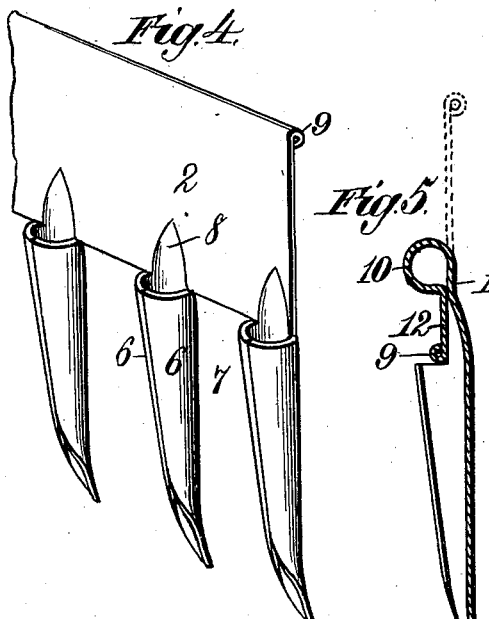
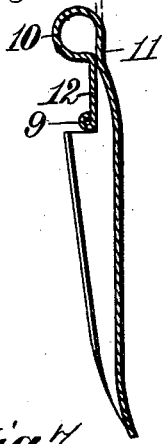
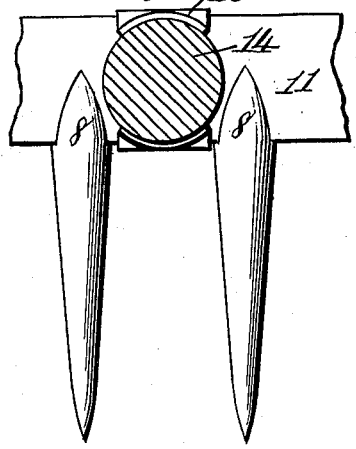
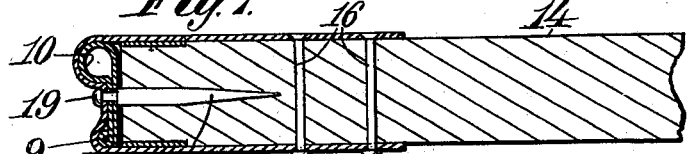
Witnesses.
Robert Everitt,
J. B. Keefer.
Inventor.
Thomas J. Peters.
By James L. Norris.
Att'y.

UNITED STATES PATENT OFFICE.

THOMAS J. PETERS, OF OWINGSVILLE, KENTUCKY.

RAKE.

SPECIFICATION forming part of Letters Patent No. 674,216, dated May 14, 1901.

Application filed November 1, 1900. Serial No. 35,149. (No model.)

*To all whom it may concern:*

Be it known that I, THOMAS J. PETERS, a citizen of the United States, residing at Owingsville, in the county of Bath and State of Kentucky, have invented new and useful Improvements in Rakes, of which the following is a specification.

This invention relates to certain new and useful improvements in metal rakes, more particularly to a rake constructed of sheet metal.

The invention aims to construct a rake made from suitable metallic material and which shall be unusually light in weight and at the same time, by the manner in which the same is constructed, materially increasing the strength of the rake head and teeth; furthermore, constructing the rake in such a manner that the same will be extremely simple, strong, durable, and efficient when in use and comparatively inexpensive to manufacture.

The invention further consists in the novel combination and arrangement of parts hereinafter more specifically described, illustrated in the accompanying drawings, and particularly pointed out in the claims hereto appended, and in describing the invention in detail reference is had to the accompanying drawings, forming a part of this specification, wherein like numerals of reference indicate corresponding parts throughout the several views, and in which—

Figure 1 is a plan view of a sheet of metal, showing in dotted lines the contour of the blanks after being cut from which my improved rake is formed. Fig. 2 is a plan view of a blank from which the rake is formed, showing at one end thereof one of the teeth-blanks projecting therefrom. Fig. 3 is a plan view of the blank, showing the formation therein of the bulged portion to permit of the rounding of the teeth when forming the same. Fig. 4 is a perspective view of the blank with the formation of the rake-teeth complete, also showing the bead formed integral with the upper end of the rake-head. Fig. 5 is a vertical sectional view illustrating the bending of the rake-head for strengthening the same. Fig. 6 is a front view of a rake embodying my invention, the handle being in section and the rake-head broken away. Fig. 7 is a longitudinal sectional view of my improved rake when complete, showing the means for attaching the same to the handle, as well as the manner in which the rake-head is strengthened by bending the same upon itself.

In manufacturing rakes in accordance with my new and improved method the blanks are cut from a sheet of suitable metallic material 1 by a die of the desired shape in such a manner that the rake-head 2 is rectangular in contour and has a series of depending teeth-blanks, which are substantially triangular in shape, as at 3, and provided at their jointure with the rake-head with longitudinally-extending slits 4 5 at each side thereof. The length of the rake-head is somewhat less than the series of teeth-blanks, or, in other words, the blank at each end projects outwardly from the rake-head, as shown at 5'. The slits are formed to enable the folding of the teeth-blanks, as at 6, and also to obtain a suitable space between each of the teeth, as at 7.

After the sheet of metal has been cut to form the blanks, as hereinbefore mentioned, the latter are each stamped by a suitable die in such manner as to bulge outwardly a portion of the rake head and teeth blanks, as at 8. This bulged portion is substantially concavo-convex in cross-section and permits of the rounding of the teeth when folded at their jointure with the rake-head as well as below the same.

After the bulged portion 8 has been formed in the blank the outer end of the rake-head is provided with a strengthening-bead 9 and then bent upon itself in such a manner as to form the loop 10 and the vertically-extending portions 11 and 12, the latter with the bead 9 engaging the top of the teeth, as shown.

Bending of the rake-head in the manner shown—that is, upon itself or so that the bead 9 engages the top of the teeth, as shown—the former forms a bearing for the latter when the rake is used and the bulged portion forms a means for strengthening the teeth at the upper end thereof. If the bead did not engage the top of the teeth, as in the manner heretofore described, the teeth would have the tendency to bend, which the formation of the rake-head in the manner shown overcomes—that is to say, by having one portion engage the teeth and another portion formed integral with the teeth. This is a material advantage, owing to the fact that the teeth when folded are hollow and one portion thereof extending outwardly from the rake-head.

After the blank has been formed in the manner hereinbefore described—that is, the rake-head formed with a bead, loop, and bent upon itself, as well as provided with a bulged portion, and the teeth-blanks folded in a substantially conical manner—the lower end thereof is curved forwardly, so that the point thereof will be out of vertical alinement with the rake-head, or, in other words, bent to a final form generally employed in rake-teeth.

The rake head and teeth are connected to the handle 14 by means of the band 15, engaging the upper and lower face thereof, and secured thereto by means of rivets 16, extending through the handle and band. The rake-head is also connected to the handle 14, by means of the tang 18, which projects therefrom and extends through the rake-head and band and is headed, as at 19, for securing the same in position. The rake head and teeth may be connected to the handle by other means; but this is what I prefer to use. Consequently I have set forth the same herein, although the application is not limited to this form of connecting means for the handle and rake head and teeth.

It is thought the many advantages of my improved rake, as obtained from the finished article, can be readily understood from the foregoing description, taken in connection with the accompanying drawings, and it will be noted that slight changes may be made in the details of construction without departing from the general spirit of my invention.

Having thus fully described my invention, what I claim as new, and desire to secure by Letters Patent, is—

1. As a new article of manufacture, a rake consisting of a series of hollow teeth formed integral with a rake-head bent upon itself.

2. As a new article of manufacture, a rake consisting of a series of teeth formed integral with a rake-head bent upon itself, and a handle connected to the said head.

3. As a new article of manufacture, a rake consisting of a series of teeth formed integral with a rake-head bent upon itself to engage said teeth, and a handle suitably connected to said head.

4. As a new article of manufacture, a rake consisting of a series of hollow teeth formed integral with a rake-head bent upon itself and engaging said teeth.

5. As a new article of manufacture, a rake consisting of a series of hollow teeth formed integral with a rake-head bent upon itself and engaging said teeth, and a handle suitably connected to said head.

In testimony whereof I have hereunto set my hand in presence of two subscribing witnesses.

THOMAS J. PETERS.

Witnesses:
 GEO. E. SULLIVAN,
 GEO. W. REA.